United States Patent [19]
Huizinga et al.

[11] Patent Number: 6,106,885
[45] Date of Patent: *Aug. 22, 2000

[54] FAT BLEND FOR MARGARINE AND W/O SPREADS

[75] Inventors: Hindrik Huizinga, Maassluis; Marcelle van den Kommer, Gouda; Cornelis Laurentius Sassen, Schiedam; Leo Frans Vermaas, Maassluis, all of Netherlands

[73] Assignee: Van Den Bergh Foods Co., divison of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/967,296

[22] Filed: Nov. 7, 1997

Related U.S. Application Data

[63] Continuation of application No. 08/557,551, Nov. 14, 1995, abandoned.

[30] Foreign Application Priority Data

Nov. 15, 1994 [EP] European Pat. Off. ............... 94203324

[51] Int. Cl.$^7$ ...................................... A23D 7/02
[52] U.S. Cl. ........................... 426/607; 426/601; 554/223
[58] Field of Search ..................... 426/607, 601; 554/223

[56] References Cited

U.S. PATENT DOCUMENTS

| | | | |
|---|---|---|---|
| 4,425,371 | 1/1984 | Stratmann | 426/607 |
| 4,486,457 | 12/1984 | Schijf | 426/607 |
| 4,510,167 | 4/1985 | Schmidt | 426/607 |
| 4,567,056 | 1/1986 | Schmidt | 426/607 |
| 4,743,402 | 5/1988 | Fick | 554/223 |
| 4,861,612 | 8/1989 | Nakano | 426/607 |
| 4,960,544 | 10/1990 | Van Putte | 426/601 |
| 5,461,171 | 10/1995 | Heaton | 554/223 |
| 5,872,271 | 2/1999 | Cole | 426/601 |

FOREIGN PATENT DOCUMENTS

| | | |
|---|---|---|
| 0 049 074 | 9/1980 | European Pat. Off. . |
| 0 070 050 | 1/1983 | European Pat. Off. . |
| 0 109 721 | 11/1983 | European Pat. Off. . |
| 4058892 | 2/1992 | Japan . |

OTHER PUBLICATIONS

International Search Report.
European Search Report.
Food Technology, Jul. 1978, Texture Profile Analysis; pp. 62–66.
Fette, Seifen, Anstrichmittel , 80, pp. 180–186 (1978).

*Primary Examiner*—Carolyn Paden

[57] ABSTRACT

A process for producing a fat blend, usable as hardstock in margarine and W/O spreads, comprising interesterifying a fat mixture comprising 30–55% liquid vegetable oil and 45–70% of a fat having at least 80% saturated fatty acids of a chain length of 16 C-atoms or more, and fractionating the interesterified product to obtain an olein fraction having a solid fat content of $$N_{10} = 54\text{-}85$$
$$N_{20} = 32\text{-}70$$
$$N_{30} = 4\text{-}30$$
$$N_{35} = <18$$

A fat blend obtainable by this process, a margarine fat containing such fatblends and a fatproduct, in particular a margarine or W/O spread containing this margarine fat, or this fatblend.

19 Claims, No Drawings

FAT BLEND FOR MARGARINE AND W/O SPREADS

This is a Continuation application of Ser. No. 08/557,551, filed Nov. 14, 1995 now abandoned.

The present invention relates to fat blends suitable, amongst other things for manufacturing margarine and w/o spreads having a lower fat content than margarine but otherwise having similar plastic spreading properties, also to a method of preparing such fat blends, to margarine fat containing such fat blend and to fat products, in particular margarine and w/o spreads prepared therewith.

Despite the great variety of fat blends for margarine and suchlike fat spreads some consumers express various requirements for such fat blends such as vegetable origin, high level of unsaturated fatty acids and a low level of trans-unsaturated fatty acids, e.g. below 10%, preferably below 5%, particularly below 2% and most preferred between 0 and 1%.

It does not need explanation that the usual requirements of easy spreadability, and good organoleptic properties including good mouthfeel should be met.

EP-A-70,050 discloses randomly interesterifying a mixture of 45–75% oil having at least 20% linoleic acid and 25–55% of a fat having at least 80% saturated fatty acids having a chain length of 16 C-atoms or more, fractionating this mixture to obtain a stearin and an olein fraction, the latter having a solids fat content:

$$N_{10} = 25\text{-}53$$
$$N_{20} = 8\text{-}28$$
$$N_{30} = 1\text{-}6$$
$$N_{35} = 0\text{-}4$$

and mixing 50–90% of this olein with 10–50% of an oil having at least 40% linoleic acid.

The solid fats content in this description and claims is being expressed as N-value, essentially as defined in Fette, Seifen, Anstrichmittel 80 180–186 (1978), although modified as regards temperature stabilisation: the samples were stabilized at 0° C. for 16 hours and tempered as described for ½ h at the respective measuring temperatures.

EP-A-109,721 describes a similar process, wherein at least 20% of the olein fraction is mixed with 0–60% of the esterified mixture and 0–65% of an oil having no solids at 10° C. or a mixture of such oil with an oil having a melting point of 28–43° C. As exemplified, the margarine fats of EP-A-109,721 comprise components originating from sunflower oil hydrogenated to a slip melting point of 32° C, incorporated either as such or as a component of the mixture that is interesterified. As a result, the margarines comprise 9–12% trans fatty acid calculated on the margarine fat. The olein fractions exemplified have $N_{20}$ values of 23.3 and 7.9, the prescribed solid content values for the olein are $N_{10}$=25–60, $N_{20}$=8–30, $N_{30}$=1–7, $N_{35}$=0–4.

Although with these processes considerable progress as regards increase of unsaturates content and with the former reduction of trans content can be achieved, are improvements still possible, also as regards spreadability and organoleptic properties.

Notably, the variety of products that can be produced with the olein fractions as described in these references is relatively small, limiting their usefulness. The approach taken in these disclosures results in rather high costs related to the specific properties of the applied fractionation processes.

With the process of EP-A-70,050 it was found in some cases not to be possible for a pre-required firmness at ambient temperature, to achieve good spreadability at refrigerator temperature. Also the perceived coolness upon eating the product was found to be sub-optimal. With respect to these last two issues, we found that better, but still not optimal results can be achieved with the process of EP-A-109,721, however, this is achieved by incorporating some trans fatty acid into the product. There is a consumer need for products with a still lower content of trans fatty acids than those of EP-A-109,721 and of the combined amount of saturated and trans fatty acids than those of both EP-A-70,050 and EP-A-109,721.

We have found that with respect to these issues improvements can be achieved. Adapting the mixing ratio of the components in the mixture to be interesterified and changing the fractionation giving an olein with a higher solids content at 20° C., are necessary to be able to obtain such benefits. Other advantages can be obtained as well, as will be described below.

Accordingly, in a first aspect, the invention provides a process for producing a fat blend, usable in particular in margarine and w/o spreads comprising:

(1) interesterifying a mixture containing 30–55 wt % of a liquid vegetable oil (i) and 45–70 wt % of a fat (ii) in which at least 80% of the fatty acid residues is saturated and has a chain length of at least 16 carbon atoms;

(2) fractionating the interesterified mixture thus obtained to obtain an olein having the following solid fat content:
$N_{10}$=54–85, preferably $N_{10}$=55–80
$N_{20}$=32–70, preferably $N_{20}$=32–60
$N_{30}$=4–30, preferably $N_{30}$=7–25
$N_{35}$<18, preferably $N_{35}$<15
and separating the higher melting stearin.

The invention also relates to a fat blend obtainable by these processes. Such fat blend can be used as such e.g. as frying oil, bakery fat or shortening, or it can be used as such as the margarine fat used for making margarine or spread.

The invention also provides a margarine fat that can be used for preparing margarines or w/o spreads comprising a liquid vegetable oil, and a structuring amount of a hardstock fat. The hardstock fat preferably consists of the fat blend of the invention, but if so desired, for modifying properties like plasticity and spreadability up to 40% of the olein fraction or fat blend may be substituted by another structuring fat having an $N20 \geq 20$ such as preferably palm kernel oil, dry fractionated palm oil stearin, another lauric fat or a mixture thereof. Such mixture may or may not have been interesterified. The trans fatty acid content of the margarine fat does not exceed 10%.

For crystallisation purposes small amounts of trans-hardened fats may be used, both in the mixture to be interesterified or in the structuring fat. The amount thereof should preferably be such that the trans-level in the final product is kept as low as possible, e.g. not exceeding the level as found in natural butter, i.e. preferably it is 0–6%, more preferably 0–3% calculated on the weight of the fat.

The invention also provides a margarine or w/o spread comprising a fat essentially consisting of the margarine fat of the present invention.

With the adapted composition of components being interesterified, the fractionation conditions can readily be chosen to provide the solids profile of the olein as described above. To fractionate the interesterified mixture, solvent fraction e.g. with acetone, or Lanza fractionation, i.e. with water and surfactants, can be employed. Preferably, however, to obtain a more natural product as perceived by the consumer, a fractionation process without using water or organic solvent, a so-called dry fractionation process is employed. Compared with the above mentioned prior art processes, such dry fractionation can be carried out in a similar manner except that typically a higher separation temperature will be applied. Whereas in the above mentioned references separation-temperatures of 33–35° C. are used, in the present process when using dry fractionation the separation temperature is typically about 40° C. or higher, e.g. up to 54° C., preferably 40–52° C., especially 43–51° C.

The present fat blend differs from those of the prior art particularly in that it has solid contents at 20° C. higher than those of the prior art. As is illustrated in the examples, associated with this is a different solids profile as a function of temperature for the fat blend and margarine fat prepared therewith, which in the resulting margarine or spread becomes perceivable as a better balance of sensoric properties. The $N_{20}$ of the fat blend most preferably is 35–58. The $N_{10}$ most preferably is in the range 57–75. Most preferably $N_{30}$ is 8–20, while $N_{35}$ most preferably is 5–13.

As is illustrated in the examples, with the present process in the fractionation, better separation efficiencies (indicative of the ease with which the fractions can be separated and therefore the filtration time required) are obtained. Also less interesterified mixture needs to be fractionated for the preparation of a certain amount of a margarine. While the yields of olein may in some cases be slightly lower in the present process, the amount of liquid oil that can be incorporated in the margarine fat for margarine or spread with a pre-required amount of solid fat at ambient temperature is substantially higher, which more than compensates for a possibly lower yield. In other cases higher yields can be obtained in the present process. Since fractionation is an expensive process, because of these factors, the present process results in substantially lower costs.

Because of this different balance of amounts and type of components in the margarine or spread, to achieve a given solids content at ambient temperature, the amount of trans fatty acids (vs EP 109,721) and of the combined amount of trans and saturated fatty acids required is lower with the present process. Since of the saturated fatty acids, particularly the $C_{12}$–$C_{16}$ are considered to be less desirable, while the present process can provide products with very low contents of such acids, the nutritional composition of the fat of the margarine or spread with a given hardness at ambient temperature, can be particularly attractive.

The solids content of a margarine fat at ambient temperature, e.g. 20° C. and the associated firmness of a margarine or spread at that temperature are critical factors in determining the stability of the product during handling, storage, distribution and use of the product. Even for products which are stored and distributed chilled, the product should be able to withstand being kept at higher temperatures repeatedly for some time e.g. at the breakfast table. Therefore, for each margarine or spread, depending on its intended use, and distribution channel as well as the region in which it is to be marketed, e.g. its climate, the solids content at 20° C. are very carefully specified and controlled. Therefore for comparing results obtained with different processes, comparing them under such conditions that the products have substantially the same solid fat contents at ambient temperature, e.g. 20° C., is often the most appropriate.

The processes of EP 70,050 and EP 109,721 prescribe that the interesterification must be random interesterification. This in practice implies that the process is carried out using a chemical catalyst. It is an advantage of the present process that equally good results can be achieved using enzymatic interesterification, e.g. using a 1,3 specific lipase to catalyse the reaction. Although in the present process random interesterification using a chemical catalyst can be applied, preferably the interesterification is effected enzymatically. Such process can be carried out at relatively low temperature and the resulting product is perceived to be more natural by the consumer.

By liquid vegetable oil is meant an oil or oil mixture from vegetable origin containing no solid fat at ambient temperature, i.e. 20° C. Preferably the oil has no solids at 15° C., more preferably at 10° C. The liquid vegetable oil preferably is selected form the group consisting of soybean oil, sunflower oil, safflower oil, rapeseed oil, cotton seed oil, maize oil, linseed oil, high oleic acid residue containing varieties of these oils, groundnut oil, olive oil and mixtures of two or more of such oils. Preferably the liquid vegetable oil (i) comprises at least 20% of linoleic acid residues. This is beneficial for nutritional reasons. To obtain optimal crystallisation properties we have found it to be beneficial for the oil (i) to contain at least 35% oleic acid residues, preferably at least 40%. High oleic acid residue containing oils e.g. of sunflower, rapeseed or safflower having as much as 75% or more oleic acid residues can advantageously be used in or as oil (i). If in such case the amount of linoleic acid residues in the oil (i) is less than 20% then preferably this is compensated for in the margarine fat by incorporating therein as liquid vegetable oil, oil that is relatively rich in linoleic acid residues.

The fat (ii) comprises at least 80% fatty acid residues which are saturated and have a chain length of at least 16 carbon atoms. Preferably the fat (ii) comprises at least 80% saturated fatty acids residues having 16–18 carbon acids. More preferably the content of such 16–18 carbon saturated fatty acids in fat (ii) is 85–100%, especially 90–100%.

According to a preferred embodiment the fat (ii) is a solvent fractionated palm oil stearin. According to another preferred embodiment, the fat (ii) is a hydrogenated oil having a slip melting point of 50–70° C. and an iodine value of less than 10, i.e. 0–10, preferably less than 3, especially about 1. Particularly preferred for use as such fat (ii) are hydrogenated soybean, sunflower, safflower, rapeseed, cottonseed or maize oil, a high oleic acid residue containing variety of such oil that has been hydrogenated, hydrogenated groundnut or olive oil or a mixture of two or more of these hydrogenated oils. To obtain the above given preferred melting point and iodine value for the hydrogenated oil used as fat (ii), the hydrogenation is suitably carried out substantially to completion, as can be done by methods well known in the art.

For logistic reasons it can be advantageous to use as oil (i) and fat (ii) oil originating from the same source, e.g. using as oil (i) a 50/50 mixture of sunflower oil and soybean oil and as fat (ii) a substantially fully hydrogenated blend of such mixture. Such hydrogenated blend can be prepared by hydrogenating the mixture of the liquid oil but alternatively of course the oils can be hydrogenated separately and combined afterwards, e.g. while preparing the mixture to be interesterified. According to a preferred embodiment both oil (i) and fat (ii) originate from the same single source, e.g. sunflower oil, which can be attractive for marketing reasons.

We have obtained particularly good results when using as oil (i) and fat (ii) oils originating from rapeseed and/or soybean, optionally further comprising high oleic type oil, notably high oleic sunflower oil. If such high oleic variety oil is employed, it is preferably used in or as oil (i).

As mentioned above, the mixture to be interesterified may comprise small amounts of trans-hardened fat, i.e. fat in which the hydrogenation has not been carried out to completion. However, any such fat should preferably not be included in amounts causing the resulting fat blend to have a trans fatty acid content higher than 15%. More preferably the trans fatty acid content of the fat blend is 0–10%, most preferably it is 0–5%. Other fats, e.g. lauric fat such as palmkernel or coconut oil, which may or may not have been fully hydrogenated, may also be incorporated in small amounts in the mixture to be interesterified. However, whether or not such components are included in the mixture to be interesterified, the amount of oil (i) in the mixture should be 30–55%, while that of fat (ii) should be 45–70%, calculated on the weight of the mixture. To obtain optimal results the combined amount of oil (i) and fat (ii) constitutes preferably 80–100%, more preferably 85–100%, especially 90–100%, of the mixture that is interesterified. Preferably the mixture to be interesterified comprises 35– 45% wt % of oil (i) and 55–65 wt % of fat (ii). Any other components incorporated in the mixture are only used for finetuning purposes.

In a preferred embodiment of the process, the interesterification is a random interesterification carried out at 25–175° C. at low moisture content using as catalyst alkali metal or alkalimetal-hydroxide or alkoxide. The reaction mixture is preferably substantially moisture-free. The minute amount of water required to allow the reaction to proceed will under practical factory conditions always be present, even in dried oil.

The process is preferably carried out such that the stearin that is separated has a solid fat content as indicated by N-values as described above of $N_{20}$=70–95, $N_{30}$=50–95, $N_{40}$=35–85. More preferably the stearin has $N_{20}$=70–95, $N_{30}$50–90, $N_{40}$=35–80.

By margarine fat is meant a fat that as such without use of other fat components, is suitable for the manufacturing of margarine or spread. The final margarine or spread may comprise minor amounts of fat not originating from the margarine fat but incorporated in the product via the addition of minor components e.g. lecithin, mono-diglyceride emulsifier, B-carotene colorant, milk powder and the like. Such minor amounts of fat originating from other sources than the margarine fat however typically constitute less than 5%, especially 0–3% of the total fat contained in the product.

As is illustrated in the examples, the softer types of fat blend of the invention can be used as such as margarine fat, e.g. to produce margarines for hot countries that do not have chilled distribution or to produce bakery margarine. Such fat blend can also be used as such, e.g. as frying fat, bakery fat or shortening. In such case, if so desired suitable amounts of other materials, e.g. colorant etc. can be incorporated. For this type of application the fat blend preferably has $N_{20}$= 32–55. However, for optimal eating quality it is usually preferred to combine fat blend with some liquid vegetable oil.

The margarine fat of the invention preferably comprises hardstock fat and liquid vegetable oil. The hardstock fat comprises 60–100% of fat blend as obtainable by the above described process, the balance, if any, consisting of structuring fat having an $N_{20}$ of at least 20. As fat blend a single olein component according to the above process can be used but of course a mixture of two or more of such oleins can be used as well. For the liquid vegetable oil of the margarine fat the same characteristics and preferred choices apply as described above for the liquid vegetable oil (i) incorporated in the mixture that is interesterified. If for the oil (i) and fat (ii) in the preparation of the fat blend, oils from the same source are used, then in a preferred embodiment, for the liquid vegetable oil of the margarine fat, oil from that same source is employed as well.

As structuring fat, up to 40% of a fat having $N_{20}$ of at least 20 can be present in the hardstock fat. As such structuring fat, for example a lauric fat, e.g. palmkernel or coconut oil, or palm oil, a stearin fraction of any such oil, any such oil fully hydrogenated and mixtures of such oils can be used. Interesterified mixtures, e.g. of a lauric oil component and palm oil stearin or fully hardened palm oil can be used in or as structuring fat. Also partially hydrogenated oil, e.g. soybean oil or cottonseed oil hydrogenated to a slip melting point of e.g. 38–45° C. can be used. However, such partially hydrogenated oils are preferably not used because they contribute to the transcontent of the product. If any such partially hydrogenated oil is present, its amount is preferably such that the margarine fat, keeping in mind the possible presence of some trans fatty acid residues in the fat blend, does not contain more than 6% trans fatty acid residues. More preferably, the trans fatty acid residue content of the margarine fat is 0–3%. Generally, as structuring fat component in the hardstock fat, preferably a fat is used having a slip melting point of 32–50° C., especially 38–48° C. Fats having a higher slip melting point than 50° C., e.g. 50–70° C. can be used as well, but any such fat should preferably not be used in an amount exceeding 5% calculated on the total margarine fat; preferably the presence of such fat, if any, is 0–3% of the margarine fat. However, in the margarine fat the present fat blend contained in the hardstock fat should dominate the hardstock properties in order to obtain the benefits of the invention. Therefore it should constitute at least 60% of the hardstock fat. Preferably the hardstock fat consists of 75–100% of the fat blend and 0–25% of the above described structuring fat. More preferably the hardstock fat comprises 85–100% of fat blend, the balance consisting of structuring fat.

As mentioned above, fatproducts, e.g. margarine, spread, shortening frying fat and the like may also contain as fat, the present fat blend as such without added liquid vegetable oil. If so desired, in such cases, the fat blend may also be used in combination with up to 40% of structuring fat having an $N_{20} \geq 20$. In such cases, for the amount and type of structuring fat the same considerations and preferences apply as described above with respect to the hardstock fat of the preferred margarine fat. If fatblend is used in combination with such structuring fat as the fat of a fatproduct, the combined fat of the fatproduct then preferably also has an $N_{20}$ of 32–55.

Margarines and spreads are typically oil or fat continuous products having a dispersed aqueous phase with plastic rheology. (Throughout this specification the terms oil and fat are used interchangeably, except where indicated otherwise). This plasticity is largely provided by a network of fat crystals in the continuous oil phase. The triglycerides of which these fat crystals consist, substantially originate from the hardstock fat of the margarine fat. For a margarine fat to be suitable for preparing margarine or spread with it, therefore, it should contain hardstock fat in an amount sufficient to provide the triglycerides required to be able to create such a network of fat crystals in the continuous oil phase of the margarine or spread. This minimum amount of hardstock fat in the margarine fat is called a "structuring amount". With the present hardstock fat, the minimum amount required in the margarine fat will typically be at least about 10%. The minimum amount of liquid vegetable oil that will preferably be included will usually be at least about 5%. In practice it will mostly be at least about 20%. Preferably the margarine fat comprises 20–70% of hardstock fat and 30–80% of liquid vegetable oil, more preferably it comprises 30–60% hardstock fat and 40–70% of liquid vegetable oil. Preferably the margarine fat consists of hardstock fat and liquid vegetable oil, but if so desired small amounts of other oils or fats may be included, e.g. palm oil olein for cost saving reasons. The presence of such other oils or fats should preferably not exceed 20%, more preferably it is 0–10% calculated on the weight of the margarine fat.

The solid fat content of the margarine fat as indicated by N-values preferably is:

$N_{10} = 10\text{-}50$ $N_{20} = 5\text{-}30$ $N_{30} = 0\text{-}11$ more preferably it is $N_{10} = 16\text{-}45$ $N_{20} = 5\text{-}20$ $N_{30} = 0\text{-}8$ $N_{35} = <5$ while it is particularly preferred for $N_{30}$ to be 2–7 and for $N_{35}$ to be 0–4.

The invention encompasses margarine and spreads comprising the present margarine fat. Such products comprise a continuous fat phase and a dispersed aqueous phase. The fat phase composition used for preparing such products may include apart from the present margarine fat small amounts of additives, e.g. lecithin, monodiglycerides, vitamins, colorant, flavours etc. The aqueous phase composition used may contain such usual ingredients as water, milk components, e.g. soured milk or buttermilk, flavour preservatives, food acid etc.

Margarine and w/o spreads can be prepared using well known processes, such as described e.g. in The Chemistry and Technology of Edible Oils and Fats and their High Fat Products by G. Hoffmann; Academic Press, London 1989, page 319 ff and in particular pages 320–321.

In preparing margarines and spreads with our margarine fat, we observed an unexpected advantage. In routine production of margarine and spreads, in practice it is not always possible to maintain optimal processing conditions. If conditions become suboptimal, product defects can occur. The skilled person knows very well that sometimes such defects noticeable in freshly prepared product may disappear in time, providing a good quality product e.g. after 1 or 2 days storage. However, such spontaneous recuperation typically only occurs for the presence of small lumps noticeable immediately after packing. Other product defects that may be caused by sub-optimal processing conditions, e.g. post-hardening, do not normally disappear upon storage. We found, however, that the present margarine fat has more spontaneous recuperation capability. If for example due to market pressure a throughput has to be employed that exceeds the optimal operating window, the product upon packing may look fine. However quickly after production, e.g. within 15 minutes substantial post-hardening and the appearance of small oil droplets on the product surface may be observed. It is thought that this may be because insufficient fat crystallisation can take place while the composition is worked in the production line because the residence time is too short in view of the high throughput. The fat crystallisation then proceeds rapidly while the product is in the pack, making it much harder and pushing liquid oil to the outside so that it appears as small droplets on the surface. We have observed with the present margarine fat that if such defect occurs because of sub-optimal process conditions, the defect usually disappears again upon storage of the product e.g. at 10° C. for 1 week. Whereas normally product in which substantial post-hardening occurs immediately after production, are hard and brittle after a week storage, with the present margarine fat such product after a week storage usually is perfectly nice and plastic while the oil droplets on the surface have disappeared again. This is a major advantage because it gives much more operating flexibility to the production.

For a better understanding of the invention it will be illustrated by the following Examples. Throughout this specification parts, percentages and proportions refer to weight unless otherwise indicated.

EXAMPLE 1

An olein fraction was produced by:

(1) randomly interesterifying a mixture consisting of 40% rapeseed oil and 60% fully hydrogenated rapeseed oil (95% saturated $C_{16}+C_{18}$ acids, I.V.=0.8).

(2) dry fractionating the interesterified blend.

The fractionation process comprised the removal of 20% solid phase, crystallised in the beta modification, to obtain an olein and a stearin fraction.

Analytical data relating to the interesterified fat blend and the olein and stearin fractions are given in Table 1.

The trans content of the olein was 0.5%. The level was measured according to J.A.O.C.S. 54, (1977), 208 as elaidic acid content (isolated mono-trans).

A margarine fat was produced by blending the olein fraction with rapeseed oil in a ratio of 41:59. The N-values of the resulting fat blend were: $N_{10}$=28.3, $N_{20}$=15.1, $N_{30}$=4.0, $N_{35}$=2.2. The trans fatty acid content of the fat after refining was 0.6%. The combined amount of saturated fatty acids (SAFA) and trans fatty acids was 26%, which is very low for a margarine fat with this N-line.

TABLE 1

| | % Solids | | | | | | Fatty Acid Composition | | | | | |
|---|---|---|---|---|---|---|---|---|---|---|---|---|
| | $N_{10}$ | $N_{15}$ | $N_{20}$ | $N_{25}$ | $N_{30}$ | $N_{35}$ | $C_{16}$ | $C_{18}$ | $C_{18:1}$ | $C_{18:2}$ | $C_{18:3}$ | $C_{20}$ |
| Interesterified blend | 81.1 | 78.1 | 71.2 | 61.7 | 50.3 | 39.6 | 5.8 | 54.1 | 23.7 | 8.3 | 4.4 | 1.4 |
| Olein fraction | 75.1 | 69.9 | 58.2 | 40.1 | 19.4 | 9.0 | 5.8 | 45.5 | 29.5 | 10.2 | 5.4 | 1.2 |
| Stearin fraction | 90.5 | 90.0 | 90.1 | 87.8 | 84.8 | 80.9 | 5.9 | 74.5 | 11.1 | 3.5 | 1.9 | 1.8 |

TABLE 2

|  | % Solids | | | | | | Fatty Acid Composition | | | | | |
| --- | --- | --- | --- | --- | --- | --- | --- | --- | --- | --- | --- | --- |
|  | $N_{10}$ | $N_{15}$ | $N_{20}$ | $N_{25}$ | $N_{30}$ | $N_{35}$ | $C_{16}$ | $C_{18}$ | $C_{18:1}$ | $C_{18:2}$ | $C_{18:3}$ | $C_{20}$ |
| Interesterified blend | 75.8 | 71.3 | 65.4 | 54.9 | 44.2 | 35.7 | 10.9 | 52.7 | 9.9 | 21.9 | 2.7 | 0.5 |
| Olein fraction | 70.3 | 64.0 | 50.1 | 29.5 | 17.1 | 11.1 | 10.1 | 44.3 | 12.6 | 26.2 | 3.9 | 0.4 |
| Stearin fraction | 87.0 | 84.8 | 84.3 | 83.0 | 78.3 | 72.4 | 11.5 | 67.5 | 6.0 | 11.5 | 1.7 | 0.6 |

An aqueous phase was prepared by mixing:

```
96.2 parts water
 2.8 parts skim milk powder
 0.5 parts K-sorbate
 0.5 parts NaCl
```

A spread was produced by (i) mixing the fat blend containing 0.2% Admul 6203 (ex Quest) and 0.25% cetinol as emulsifiers (80 wt %) and the aqueous phase (20 wt %) as defined above and (ii) processing the mixture at laboratory scale through an A-C-A-A-C sequence with a throughput of 3.2 kg/hr, an exit temperature on the first C-unit (150 rpm) of 14° C., an exit temperature on the third A-unit (600 rpm) of 13° C., an exit temperature on the second C-unit (150 rpm) of 16.3° C. and a line pressure of 5 bar.

A good product resulted with the following "Stevens" values (1 week) at the indicated measuring temperatures:

| | |
| --- | --- |
| $S_{10}$ | 290 |
| $S_{20}$ | 50 |

The "Stevens" hardness St, expressed in grams, was determined 1 week after manufacturing the spread when stored at 5° C. and thereafter equilibrated for 24 hours at the temperature as indicated, using a 4.4 mm Ø cylinder in a Stevens-LFRA Texture Analyzer (ex Stevens Advanced Weighing Systems, Dunmore, U.K.) load range 1000 g operated "normal" and set at 10 mm penetration depth and 2.0 mm/s penetration rate.

The melting behaviour in the mouth was assessed by a panel and found to be very good ("quick"). The thinness of the product, a measure for the melting behaviour in the mouth, was 210.

The consistency of the products remained constant upon the temperature cycling and after 9 weeks storage.

EXAMPLE 2

A margarine fat was produced by blending the olein fraction described in example 1, with rapeseed oil and palm kernel fat in a ratio of 39:56:5. The N-values of the resulting fat blend were: $N_{10}$=29.3, $N_{20}$=14.6, $N_{30}$=4.1, $N_{35}$=2.0.

A spread was produced by (i) mixing the fat containing the same emulsifiers as in example 1 (80 wt %) and the aqueous phase (20 wt %) as defined in example 1 and (ii) processing the mixture according to the procedure as described in example 1.

A good product resulted with the following "Stevens" values (1 week) at the indicated measuring temperatures:

| | |
| --- | --- |
| $S_{10}$ | 250 |
| $S_{20}$ | 40 |

The melting behaviour in the mouth was assessed by a panel and found to be comparable to the spread produced at example 1.

The consistency of the products remained constant upon temperature cycling and after 9 weeks storage.

EXAMPLE 3

An olein fraction was produced by:
(1) randomly interesterifying a mixture consisting of 40% soybean oil and 60% fully hydrogenated soybean oil (97% saturated $C_{16}$+$C_{18}$ acids, slip melting point 69° C., I.V.=0.4).
(2) dry fractionating the interesterified blend.

The fractionation process comprised the removal of 20% solid phase, crystallised in the beta modification, to obtain an olein and a stearin fraction.

Analytical data relating to the interesterified fat blend and the olein and stearin fractions are given in Table 2.

The trans content of the olein was 0.4%.

A margarine fat was produced by blending the olein fraction with rapeseed oil and palm kernel fat in a ratio of 41:53:6. The N-values of the resulting fat blend were: $N_{10}$=30.4, $N_{20}$=12.7, $N_{30}$=5.0, $N_{35}$=3.0.

A spread was produced by (i) mixing the fat blend containing the same emulsifiers as in example 1 (80 wt %) and the aqueous phase (20 wt %) as defined in example 1 and (ii) processing the mixture at pilot plant scale through an A-A-C-A-C sequence with a throughput of 70 kg/hr, an exit temperature on the first C-unit (200 rpm) of 5.5° C., an exit temperature on the third A-unit (600 rpm) of 4.0° C., an exit temperature on the second C-unit (250 rpm) of 6.3° C. and a line pressure of 27 bar.

A good product resulted with the following "Stevens" values (1 week) at the indicated measuring temperatures:

| | |
| --- | --- |
| $S_{10}$ | 154 |
| $S_{20}$ | 32 |

The melting behaviour in the mouth was assessed by a panel and found to be very good ("quick").

The consistency of the products remained constant upon temperature cycling and after 9 weeks storage.

EXAMPLES 4–5

A series of trials was done comparing the present invention with the disclosures of EP 70,050 and EP 109,721.

Batches of sunflower oil were hydrogenated in conventional manner to a slip melting point of 32° C. and of 69° C.

The iodine value of the latter was 0.6, it contained 98% saturated $C_{16}+C_{18}$ acids. Mixtures were prepared from these components and unmodified sunflower oil as follows:

| wt % | Comp. 1 | Comp. 2 | Ex. 4 | Ex. 5 |
|---|---|---|---|---|
| Sunflower oil | 60 | 46 | 50 | 37 |
| Hydr. Sunflower oil smp 32° C. | — | 14 | — | — |
| Hydr. Sunflower oil smp 69° C. | 40 | 40 | 50 | 63 |

The mixtures were vacuum dried and interesterified in conventional manner at 110° C. for 30 minutes using 0.12 wt % $NaOC_2H_5$ (ex Merck).

Each interesterified mixture was separated into 3 or 5 batches which were dry fractionated in conventional manner separately. The olein fractions obtained from each interesterified mixture were evaluated separately but found to be very similar. There they were combined. The same applied for the stearin fractions.

In the fractionations, the mixture was heated to 80° C. cooled fast to 55° C. in a stirred crystallizer and then slowly to the separation temperature. The mixture was allowed to stabilize at the separation temperature for about 2 hours and then the fractions were separated using a Hafico press® operating at 6 bar. Separation efficiency was determined after 60 minutes at 6 bar pressure.

The temperature at separation, the average separation efficiency and olein yield obtained and analytical data on the interesterified mixtures and the olein and stearin fractions are given in table 3.

TABLE 3#

| | Comp. 1 | Comp. 2 | Ex. 4 | Ex. 5 |
|---|---|---|---|---|
| Interesterified mixture | | | | |
| $N_{10}$ | 48.8 | 62.8 | 63.9 | 77.7 |
| $N_{20}$ | 33.6 | 46.4 | 51.2 | 70.3 |
| $N_{30}$ | 16.1 | 25.0 | 29.9 | 50.2 |
| $N_{40}$ | 9.5 | 14.0 | 18.1 | 38.1 |
| $N_{50}$ | 3.7 | 5.8 | 10.1 | 21.5 |
| $C_{16}$ | 6.9 | 6.9 | 6.9 | 7.0 |
| $C_{18}$ | 38.5 | 39.4 | 47.3 | 58.7 |
| $C_{18:1}$ (cis + trans)* | 12.9 | 20.2 | 10.8 | 8.0 |
| $C_{18:2}$ (cis + trans)* | 40.0 | 31.0 | 33.4 | 24.7 |
| $C_{18:3}$ (cis + trans)* | 0.2 | 0.2 | 0.2 | 0.1 |
| Others | 1.5 | 2.3 | 1.4 | 1.5 |
| Fractionation | | | | |
| Separation temperature (° C.) | 34 | 35 | 45 | 52 |
| Avg. separation efficiency | 0.46 | 0.51 | 0.64 | 0.61 |
| Avg. olein yield (%) | 71 | 69 | 82 | 66 |
| Olein | | | | |
| $N_{10}$ | 41.0 | 51.3 | 56.6 | 69.3 |
| $N_{15}$ | 32.1 | 40.9 | 49.3 | 64.9 |
| $N_{20}$ | 18.7 | 26.9 | 35.6 | 55.3 |
| $N_{25}$ | 4.2 | 11.1 | 19.9 | 31.1 |

TABLE 3#-continued

| | Comp. 1 | Comp. 2 | Ex. 4 | Ex. 5 |
|---|---|---|---|---|
| $N_{30}$ | 1.2 | 4.6 | 9.8 | 17.0 |
| $N_{35}$ | 0.4 | 2.0 | 5.7 | 11.4 |
| $C_{16}$ | 6.4 | 6.5 | 7.0 | 7.2 |
| $C_{18}$ | 33.8 | 33.6 | 41.5 | 50.1 |
| $C_{18:1}$ (cis + trans)* | 14.2 | 22.0 | 12.3 | 10.3 |
| $C_{18:2}$ (cis + trans)* | 44.0 | 35.4 | 37.6 | 30.8 |
| $C_{18:3}$ (cis + trans)* | 0.2 | 0.2 | 0.2 | 0.2 |
| Others | 1.4 | 2.3 | 1.4 | 1.4 |
| Stearin | | | | |
| $N_{10}$ | 65.9 | 81.2 | 84.2 | 88.7 |
| $N_{20}$ | 59.2 | 72.0 | 80.1 | 85.8 |
| $N_{30}$ | 45.2 | 57.7 | 78.5 | 86.2 |
| $N_{40}$ | 33.1 | 41.5 | 67.5 | 75.5 |
| $N_{50}$ | 21.5 | 26.0 | 53.6 | 61.8 |

*For comparison 1 and Examples 4 and 5 the total contents of trans fatty acids in the olein are negligible, about 0.5% or less. In the olein of Comparison 2 the total trans fatty acid content was 6.6%.
The fatty acid compositions were measured in conventional manner by converting the fat into FAME (fatty acids methyl esters) and measuring their composition with GLC.

Considering the variability inevitably occurring in trials done many years apart, e.g. originating from fluctuations in raw material properties, the results obtained in comparisons 1 and 2 are comparable with those described in the Examples 1 of EP 70,050 and EP 109,721, respectively. When comparing the olein of comparison 1 with that of EP 70,050, comparison 1 would be judged to reflect a better execution of the process of EP 70,050 than that described in EP 70,050's example 1.

Although the olein yield of Ex. 5 is somewhat lower than that of the comparisons, the yield of example 4 is clearly higher. The separation efficiencies for the examples is clearly better than those of the comparisons.

The olein of example 4 can be used as such as margarine fat for making multipurpose margarine for countries with a warm climate without chilled distribution. This can also be done with the olein of example 5 mixed with liquid vegetable oil. The oleins of the comparisons, however, are not appropriate for this application. The resulting products would not survive distribution in good condition. Both oleins of examples 4 and 5 can be used as such or as margarine fat in margarine for certain bakery applications. For these applications the oleins of the comparisons would not give good results. However, for any application for which the oleins of the comparison can be used, the oleins of examples 4 and 5 can be used as well by just mixing the olein with some liquid vegetable oil and/or if so desired some other oil or fat, e.g. palm oil olein.

EXAMPLES 6–13

Using the fat blends described in Examples 4–5, a number of margarine fats were produced. The compositions and the resulting SAFA and trans contents are given in Table 4.

TABLE 4

|  | Comp. 3 | Comp. 4 | Comp. 5 | Comp. 6 | Ex. 6 | Ex. 7 | Ex. 8 | Ex. 9 | Ex. 10 | Ex. 11 |
|---|---|---|---|---|---|---|---|---|---|---|
| Fat blend of Comp. 1 | 80 | 83 | — | — | — | — | — | — | — | — |
| Fat blend of Comp. 2 | — | — | 60 | 65 | — | — | — | — | — | — |
| Fat blend of Ex. 4 | — | — | — | — | 45 | 50 | 55 | — | — | — |
| Fat blend of Ex. 5 | — | — | — | — | — | — | — | 30 | 35 | 40 |
| Sunflower oil | 20 | 17 | 40 | 35 | 55 | 50 | 45 | 70 | 65 | 60 |
| $N_{10}$ | 30.4 | 32.3 | 27.8 | 30.6 | 22.0 | 25.2 | 28.1 | 17.7 | 21.7 | 25.3 |
| $N_{20}$ | 11.3 | 11.6 | 10.4 | 11.8 | 9.8 | 11.5 | 13.1 | 8.1 | 10.3 | 12.2 |
| $N_{30}$ | 1.1 | 1.2 | 2.0 | 2.2 | 3.2 | 3.4 | 3.8 | 3.5 | 4.0 | 4.6 |
| $N_{35}$ | 0.6 | 0.6 | 1.0 | 1.2 | 2.0 | 2.2 | 2.6 | 2.2 | 2.5 | 3.2 |
| SAFA | 35 | 36 | 30 | 32 | 29 | 31 | 33 | 26 | 28 | 31 |
| Trans* | — | — | 4.0 | 4.3 | — | — | — | — | — | — |

*indicates less than 1%.

These results show that for similar $N_{20}$ values, e.g. suitable for making a tub margarine, the margarine fats of the invention have lower $N_{10}$ values than the comparison, giving better spreadability at refrigerator temperature, and lower SAFA+trans values.

With the fat blends of Comp. 1 and Comp. 2 margarine fats as steep as those of Ex. 6–11 cannot be made. Should it somehow be desired to have relatively high $N_{10}$ values such as those of Comp. 3–6, this could be achieved with the present fat blends e.g. by replacing part of the sunflower oil of Ex.6 with e.g. palm olein and/or palmkernel oil.

Similarly, a number of margarine fats were made that could be used for making margarine to be packed in a wrapper. The results are given in Table 5.

TABLE 5

|  | Comp. 1 | Comp. 7 | Ex. 12 | Ex. 13 |
|---|---|---|---|---|
| Fat blend of Comp. 1 | 100 | — | — | — |
| Fat blend of Comp. 2 | — | 85 | — | — |
| Fat blend of Ex. 4 | — | — | 70 | — |
| Fat blend of Ex. 5 | — | — | — | 60 |
| Sunflower oil | — | 15 | 30 | 40 |
| $N_{10}$ | 41.0 | 42.5 | 36.7 | 39.3 |
| $N_{20}$ | 18.7 | 18.8 | 18.9 | 23.0 |
| $N_{30}$ | 1.2 | 3.8 | 5.5 | 8.0 |
| $N_{35}$ | 0.4 | 1.6 | 3.5 | 5.7 |
| SAFA | 41 | 38 | 38 | 40 |
| Trans | — | 5.6 | — | — |

These margarine fats show the same qualitative differences as those illustrated for the softer fats. Please note that for Ex.13 to be directly comparable to the other fats, its composition should be finetuned by raising the liquid sunflower oil proportion slightly to obtain an $N_{20}$ value closer to those of the other fats.

EXAMPLES 14–15

Using the fat blends described in Ex. 4–5 (after refining them), a number of margarine fats and tub margarines were prepared as shown in Table 6.

TABLE 6

| Margarine Fat | Comp. 8 | Comp. 9 | Ex. 14 | Ex. 15 |
|---|---|---|---|---|
| Fat blend of Comp. 1 | 85 | — | — | — |
| Fat blend of Comp. 2 | — | 65 | — | — |
| Fat blend of Ex. 4 | — | — | 52 | — |
| Fat blend of Ex. 5 | — | — | — | 40 |
| Refined Sunflower oil | 15 | 35 | 48 | 60 |
| $N_5$ | 36.9 | 34.8 | 29.2 | 27.4 |
| $N_{10}$ | 31.5 | 29.5 | 25.2 | 23.8 |
| $N_{20}$ | 11.8 | 11.4 | 11.7 | 13.2 |
| $N_{30}$ | 0.6 | 2.0 | 3.6 | 4.3 |
| $N_{35}$ | 0.4 | 1.0 | 1.6 | 3.2 |
| SAFA + Trans | 37 | 36 | 32 | 31 |

Fat phase and aqueous phase compositions were prepared with the following compositions:

| fat phase composition: | 79.60 parts margarine fat |
| | 0.1 part monoglyceride |
| | 0.2 parts lecithin |
| | p.m. colorant |
| aqueous phase composition: | 18.9 parts water |
| | 0.3 parts salt |
| | 0.7 parts whey powder |
| | 0.1 part preservative |
| | p.m. citric acid to pH 4.7 |

Margarines were produced with these compositions using a Votator with an ACAAC sequence. The A-units operated at 1200 rpm, the C-units at 150 rpm. The premix temperature was 50° C. The residence time was 283 seconds. The temperature after the last A-unit was 6° C. The product after the last C-unit had a temperature of 10° C. The products were filled into tubs and stored at 10° C.

After 1 week storage, to characterise the texture of the products at refrigerator temperature, Texture Profile Analysis (TPA) was carried out as described in Food Technology, July 1978, 62–66. The analysis was carried out using the Stevens-LFRA Texture Analyser described above (probe 4.4 mm ø, speed 2.0 mm/s, penetration depth 10.0 mm).

The fracturability or brittleness was the least good for comparison 9; it was best for Ex. 14. The brittleness for comp. 8 and Ex. 15 was similar.

The following quantitative results were obtained:

|  | Comp. 8 | Comp. 9 | Ex. 14 | Ex. 15 |
|---|---|---|---|---|
| Hardness | 495 | 673 | 565 | 585 |
| Cohesiveness | 0.28 | 0.16 | 0.33 | 0.38 |
| Adhesiveness | −280 | −404 | −476 | −710 |
| Springiness | 0.5 | 0.2 | 0.6 | 0.8 |
| Gumminess | 138 | 111 | 184 | 223 |
| Chewiness | 96 | 85 | 148 | 204 |

The "hardness" as defined in this characterisation, for the two examples was inbetween those of the two comparisons. The "hardness" of comp.9 was judged to be too high. All other parameters indicate that Ex.14 and Ex.15 had a better, more plastic structure than the two comparisons.

EXAMPLES 16–17

A similar series of trials was done as in examples 14–15 except that wrapper margarines were produced.

TABLE 7

| Margarine fat | Comp. 10 | Comp. 11 | Ex. 16 | Ex. 17 |
|---|---|---|---|---|
| Fat blend of Comp. 1 | 100 | — | — | — |
| Fat blend of Comp. 2 | — | 90 | — | — |
| Fat blend of Ex. 4 | — | — | 73 | — |
| Fat blend of Ex. 5 | — | — | — | 55 |
| Refined sunflower oil | — | 10 | 27 | 45 |
| $N_{10}$ | 41.0 | 45.6 | 37.6 | 34.6 |
| $N_{20}$ | 18.7 | 20.6 | 18.9 | 19.5 |
| $N_{30}$ | 1.2 | 4.0 | 5.1 | 7.0 |
| $N_{35}$ | 0.4 | 1.7 | 3.0 | 4.8 |
| SAFA + Trans | 41 | 45 | 39 | 38 |

The fat phase and aqueous phase compositions were the same as in Examples 14–15 except for the margarine fats used.

For producing the margarines a Votator with ACAAB sequence was used. The residence time was 196 seconds. The temperature after the last A-unit was again 6° C., that after the resting tube B was 9° C. The products were packed in wrappers and stored at 10° C. The products of comparisons 10 and 11 were very difficult to pack. They were soft and as a result the corners of the packs were unacceptably rounded. They could not withstand being stacked on top of each other; such problems did not occur for the Examples 16 and 17.

For these samples also, after 1 week storage, TPA analysis was done at 5° C. The assessments were done using the same conditions as in Ex.14 and 15.

The brittleness of comparison 10 and example 17 were similar. That of comparison 11 was worst while Ex.16 was best.

Quantitative results:

|  | Comp. 10 | Comp. 11 | Ex. 16 | Ex. 17 |
|---|---|---|---|---|
| Hardness | 518 | 1579 | 949 | 867 |
| Cohesiveness | 0.27 | 0.12 | 0.28 | 0.26 |
| Adhesiveness | −380 | −448 | −979 | −730 |
| Springiness | 0.5 | 0.2 | 0.6 | 0.5 |
| Gumminess | 138 | 185 | 268 | 221 |
| Chewiness | 128 | 183 | 232 | 189 |

The hardness of Ex. 16 and 17 was judged to be normal for this type of product. Comparison 11 had become excessively hard. Comparison 10 was too soft for a wrapper product. Except for the springiness, which is the same for Ex. 17 and Comp. 10, all other parameters indicate a better, more plastic structure for Ex. 16 and 17 relative to comparisons 10 and 11.

Samples were further evaluated blind by an experienced panel. To prevent that the packing problems of comp. 10 and 11 could be seen, the sides were cut from the packs.

The samples had been conditioned at 15° C. The samples of Ex. 16 were found to be the best. The structure of the product was homogeneous and very plastic. Spreadability was very good. Ex. 17 was the second best product. Structure and spreadability were not quite as good as Ex. 16. It was noticed, however, that the product was a bit thick in the mouth. The samples of comparison 11 were found to be not homogeneous and too hard. Spreading was difficult. Structure and spreadability of comp. 10 was similar to comp. 11. In addition it was noticed that upon scooping the product from the pack and spreading it, the product released moisture. This is a serious product defect because it indicates a risk of microbiological deterioration upon use of the product by the customer.

EXAMPLE 18

An olein fraction was produced in a similar manner as described in Example 3. The N-values obtained were $N_{10}$=68.6, $N_{20}$=47.6, $N_{30}$=10.6, $N_{35}$=5.9. 23 parts of this olein were mixed with 65 parts of soybean oil and 12 parts of soybean oil hydrogenated to a slip melting point of 43° C. The resulting margarine fat had a trans fatty acid content 98%. Its N-values were $$N_{10} = 22.8$$
$$N_{20} = 8.1$$
$$N_{30} = 1.9$$
$$N_{35} = 0.7$$

68 parts of fat phase composition comprising
   67.4 parts of the margarine fat
   0.1 parts of monoglyceride
   0.2 parts of lecithin
and 32 parts of aqueous composition comprising
   28.7 parts water
   1.7 parts salt
   1.8 parts whey powder
were used for preparing a spread using an ACAAC sequence.

In one trial a residence time of 185 seconds was applied, in another one the throughput was increased to provide a residence time of only 92 seconds. The products were packed in tubs. In both cases packability was good. However, in the product produced with the short residence time, after 15 minutes the hardness had strongly increased and oil droplets were appearing on the surface. After one week storage at 15° C., these product defects had disappeared and both products were judged to be good.

EXAMPLE 19

A mixture of 28 parts high oleic sunflower oil, 12 parts soybean oil and 60 parts fully hydrogenated soybean oil was randomly interesterified and dry fractionated in conventional manner. The olein obtained had the following N-values $N_{10} = 82.7$ $N_{20} = 67.2$ $N_{30} = 24.5$ $N_{35} = 13.2$ 37 parts olein were mixed with 63 parts soybean oil. This margarine fat had $N_{10} = 28.5$ $N_{20} = 13.8$ $N_{30} = 4.3$ $N_{35} = 2.1$ With this margarine fat a margarine containing 80% fat was produced in a conventional manner using an ACAAC sequence.

A good product was obtained having after 1 week storage at 15° C. an $S_{10}$ of 270 and an $S_{20}$ of 61 which did not change during storage up to 9 weeks, and showing no oil exudation.

EXAMPLE 20

An olein was prepared from an interesterified mixture of 40 parts sunflower oil 35 parts fully hardened sunflower oil 25 parts fully hardened cottonseed oil The N-values of the olein were $N_{10} = 68.9$ $N_{20} = 49.8$ $N_{30} = 15.2$ $N_{35} = 9.8$ 42 parts olein were mixed with 58 parts rapeseed oil. This margarine fat had $N_{10} = 25.4$ $N_{20} = 10.3$ $N_{30} = 3.9$ $N_{35} = 2.3$ With this margarine fat an 80% fat margarine comprising otherwise conventional ingredients only was prepared in a conventional manner using an AACAC sequence. The exit temperature was 2° C. A good product was obtained, having an $S_{10}$ of 225 and an $S_{20}$ of 50 after 1 week storage at 15° C.

EXAMPLE 21

Three oleins were prepared as described in example 3. The separation temperature was varied to obtain oleins of different hardness (fat blends A, B and C). Further an olein was prepared from an interesterified mixture of 28% high oleic sunflower oil, 12% soybean oil and 60% fully hardened soybean oil (fat blend D). The N-values obtained were:

| Fat blend | A | B | C | D |
| --- | --- | --- | --- | --- |
| $N_{10}$ | 68.6 | 71.9 | 72.6 | 80.6 |
| $N_{20}$ | 47.6 | 53.5 | 56.2 | 63.6 |
| $N_{30}$ | 10.6 | 19.2 | 24.4 | 24.0 |
| $N_{35}$ | 5.9 | 12.7 | 17.0 | 12.9 |

Comparison of examples C and D shows that the replacement of part of the soybean oil with high oleic sunflower oil results in a steeper N-line: while the $N_{30}$ is the same, the $N_{35}$ is lower and the $N_{20}$ is higher for example D. For many applications, such steepness is beneficial.

With these fat blends, a series of margarine fats were prepared designed to have similar $N_{20}$ value. The compositions, N-values and SAFA +trans contents (in all cases, trans<1%) were:

| Margarine fat | E | F | G | H | I |
| --- | --- | --- | --- | --- | --- |
| Fat blend A | 36 | 38 | — | — | — |
| Fat blend B | — | — | 33 | — | — |
| Fat blend C | — | — | — | 31 | — |
| Fat blend D | — | — | — | — | 29 |
| Sunflower oil | 63 | 62 | 67 | 69 | 71 |
| Fully hardened soybean oil | 1 | — | — | — | — |
| $N_{10}$ | 24 | 24 | 21 | 20 | 19.5 |
| $N_{20}$ | 9.5 | 8 | 10 | 10 | 9 |
| $N_{30}$ | 3 | 2 | 4 | 4 | 3 |
| $N_{35}$ | 2 | 1 | 2.5 | 3 | 2 |
| SAFA + trans | 29 | 29 | 27 | 26 | 25 |

With these margarine fats, fat phase and aqueous phase compositions were prepared as follows:

| Fat phase: | 79.4% margarine fat |
| --- | --- |
| | 0.04% monoglyceride |
| | 0.2% lecithin |
| | p.m. β-carotene |
| Aqueous phase: | 18.96% water |
| | 0.3% salt |
| | 1.0% skimmilk powder |
| | 0.1% potassium sorbate |
| | p.m. citric acid to pH 4.4 |

Margarines were prepared using an ACAAC sequence with a net throughput corresponding to an average residence time of 246 seconds. Recirculation was applied from the exit of the last A-unit to the entrance of the first C-unit. Cooling was applied such that the temperature of the flow after the last A-unit was 6° C. The temperature after the last C-unit was about 7° C. The products were filled into tubs and stored at 10° C.

The products were evaluated after 1 week. The following results were obtained:

| Margarine fat used | E | F | G | H | I |
|---|---|---|---|---|---|
| $S_{10}$ | 202 | 171 | 155 | 165 | 79 |
| $S_{20}$ | 27 | 14 | 25 | 23 | 11 |
| Thinness | 240 | 135 | 250 | 290 | 190 |

Products E and G were judged to be good. Product G was preferred because its spreadability at refrigerator temperature was better and because its SAFA+trans content is lower. Furthermore, less of the expensive fat blend needs to be used to obtain a margarine fat with which the desired firmness at ambient temperature can be obtained. Product F was found to be somewhat soft. It also showed some oil exudation after packing, although this had disappeared after 1 week storage. Comparing products E and F shows that this softness of example F can be corrected by just incorporating 1% fully hardened soybean oil, even if the amount of liquid sunflower oil is slightly increased as well. Alternatively, product F can be made somewhat firmer by raising the fat blend content of the margarine fat somewhat. Product H was very similar to product G. Product G was preferred because its melting behaviour in the mouth upon eating the product was found to be somewhat better. Product I was very soft. It was considered that possibly for this margarine in the process used too much working was applied. Therefore, trials were done again with composition I, in which higher throughputs were used and/or recirculation was not applied. Initial findings indicate that good, substantially firmer products are obtained. The composition I is particularly attractive because of its very low SAFA+trans content.

EXAMPLE 22

Using the fat blend of example 1, a margarine fat was prepared comprising:

| | |
|---|---|
| 34 parts | fat blend |
| 56 parts | rapeseed oil |
| 5 parts | palmkernel oil |
| 5 parts | of an interesterified mixture of 50 parts fully hydrogenated palm oil and 50 parts fully hydrogenated palmkernel oil. |

The N-values were approximately:

| | |
|---|---|
| $N_{10}$: | 27 |
| $N_{20}$: | 14 |
| $N_{30}$: | 5 |
| $N_{35}$: | 2.5 |

The margarine fat was substantially free of trans fatty acids. It was refined in a conventional manner and used for preparing margarine containing 80% fat and having an otherwise conventional composition, using an AACAC sequence. The volume of the C-units was 1.5 and 31 respectively. The throughput was 90 kg/h. Chilling was applied to the A-units such that the product exited from the last A-unit having a temperature of 5° C. The product was filled into tubs and stored at 15° C.

After 1 week the Stevens values at 10 and 20° C. were 136 and 43, respectively. These values hardly changed during storage for 14 weeks. The product was judged to be very good.

EXAMPLE 23

An olein fraction was prepared as described in Example 3. The N-values obtained were: $N_{10}$=68.6, $N_{20}$=50.7, $N_{30}$=17.0, $N_{35}$=10.8. This fat blend was refined in a conventional manner and 42 parts of it were mixed with 58 parts refined rapeseed oil. The N-values of this margarine fat were:

$$N_{10} = 27.4$$
$$N_{20} = 11.0$$
$$N_{30} = 4.4$$
$$N_{35} = 2.7$$

A pre-emulsion was prepared having the following composition:

| | |
|---|---|
| 79.67% | margarine fat |
| 0.13% | monoglyceride |
| 0.20% | lecithin |
| 19.25% | water |
| 0.10% | salt |
| 0.55% | whey powder |
| 0.10% | potassium sorbate |
| p.m. | citric acid to pH 4.4. |

Margarine was prepared from this pre-emulsion on a pilot scale votator using an AACAC sequence. The throughput was 70 kg/h corresponding to a residence time of 246 seconds. The exit temperature of the emulsion after the last C-unit was 2° C. The product was packed in tubs. It was very homogeneous, showed little post-hardening and no oil exudation. It was stored at 15° C. and evaluated after 1 week. The Stevens values were $S_{10}$=240, $S_{20}$=60. The product was judged to be very good. Also after 2 month storage the product was still very good.

What is claimed is:

1. A process for producing a fat blend, usable in margaine and w/o spreads comprising:
    (1) interesterifying a mixture containing 30–55 wt % of a liquid vegetable oil (i) and 45–70 wt % of a fat (ii) in which at least 80% of the fatty acid residues is saturated and has a chain length of at least 16 carbon stoms;
    (2) fractionating the interesterified mixture thus obtained to obtain an olein having the following solid fat content:
    $N_{10}$=54–85
    $N_{20}$=32–70
    $N_{30}$=4–30
    $N_{35}$<18
    and separating higher melting stearin having the following solid fat contents:
    $N_{20}$=70–95
    $N_{30}$=50–95
    $N_{40}$=35–85.

2. A process according to claim 1 wherein step (1) comprises interesterifying a mixture containing 35–45 wt % of oil (i) and 55–65 wt % of fat (ii).

3. A process according to claim 1, in which oil (i) is a vegetable oil selected from the group consisting of soybean oil, sunflower oil, safflower oil, rapeseed oil, cottonseed oil, maize oil, linseed oil, high oleic acid residue containing varieties thereof, groundnut oil, olive oil and mixtures of two or more thereof.

4. A process according to claim 1, in which the fat (ii) is a hydrogenated oil having a melting point ranging from 50 to 70° C. and an iodine value of less than 10.

5. A process according to claim 1, in which the fat (ii) is hydrogenated soybean oil, sunflower oil, safflower oil, rapeseed oil, cottonseed oil, maize oil, linseed oil, a high oleic acid residue containing variety thereof, groundnut oil, olive oil or a mixture of two or more of said hydrogenated oils.

6. A process according to claim 1, in which the fat (ii) is a solvent fractionated palm oil stearin.

7. A process according to claim 1, in which oil (i) and fat (ii) are of the same source.

8. A process according to claim 1, in which oil (i) and fat (ii) consist of rapeseed or soybean oil, or a mixture thereof,.

9. A process according to claim 8 in which oil (I) and fat (II) further comprises high oleic sunflower oil.

10. A process according to claim 1, wherein the interesterification is catalysed by enzymes.

11. A process according to claim 1, in which the interesterification is random interesterification carried out at 25–175° C. under substantially moisture-free conditions using an alkalimetal, an alkalimetal-hydroxide or -alkoxide.

12. A process according to claim 1, in which step (2) consists of a dry-fractionation at a temperature ranging from 40 to 52° C.

13. A process according to claim 1, wherein oil (i) is an oil in which at least 20% of the fatty acid residues consist of linoleic acid.

14. A process according to claim 1, wherein the combined amount of oil (i) and fat (ii) constitutes 80–100% of the mixture that is interesterified.

15. A fat blend obtainable by the process of claim 1.

16. Fat product comprising as a fat, a fat blend according to claim 15 combined with up to 40% structuring fat having an $N_{20} \geq 20$, the fat of the fat products having an $N_{20}$ of 32–55.

17. A spread product comprising:

(a) a margarine fat comprising:

(i) a liquid vegetable oil; and (ii) a structuring amount of a hard stock fat the hard stock fat consisting essentially of 60–100% of a fat blend prepared by a process comprising the following steps:

(1) interesterifying a mixture containing 30–55 wt. % of a liquid vegetable oil (i) and 45–70 wt. % of a fat (ii) in which at least 80% of fatty acid residues are saturated and have a chain length of at least 16 carbon atoms, (2) fractionating the interesterified mixture to obtain an olein having the following solid fat content:

$N_{10}$=54–85

$N_{20}$=32–70

$N_{30}$=4–30

$N_{35}$ <18

(3) separating the higher melting stearin from the olein fraction; and (iii) 0 to 40% of a structuring fat having an $N_{20}$ greater than or equal to 20;

the margarine fat having a level of trans fatty acids not exceeding 10%; said spread having stability during handling, storage, distribution and use; and Stevens values as follows: $S_{10}$ of about 290 and $S_{20}$ of about 50.

18. A spread product according to claim 17 wherein the vegetable oil is selected from the group consisting of soybean oil, sunflower oil, safflower oil, rapeseed oil, cottonseed oil, maize oil, linseed oil, oils comprising oleic acid residues, groundnut oil, olive oil and mixtures thereof.

19. A spread product according to claim 17 wherein the margarine fat has a trans fatty acid content of 0.0 to 6.0%.

* * * * *